3,477,894
APPARATUS FOR PRODUCING MOLDED
PLASTIC GOODS
Roderich Graff, Burgberg-Villingen, Karl Johann Reichl, Josef Butz, and Karl Pausch, Weiden, Germany, assignors to Deutsche Tafelglas Aktiengesellschaft
Original application Dec. 8, 1961, Ser. No. 158,945. Divided and this application May 8, 1964, Ser. No. 368,761
Claims priority, application Germany, Dec. 10, 1960, D 34,922
Int. Cl. B31f 1/22; B32b 31/06
U.S. Cl. 156—459
5 Claims

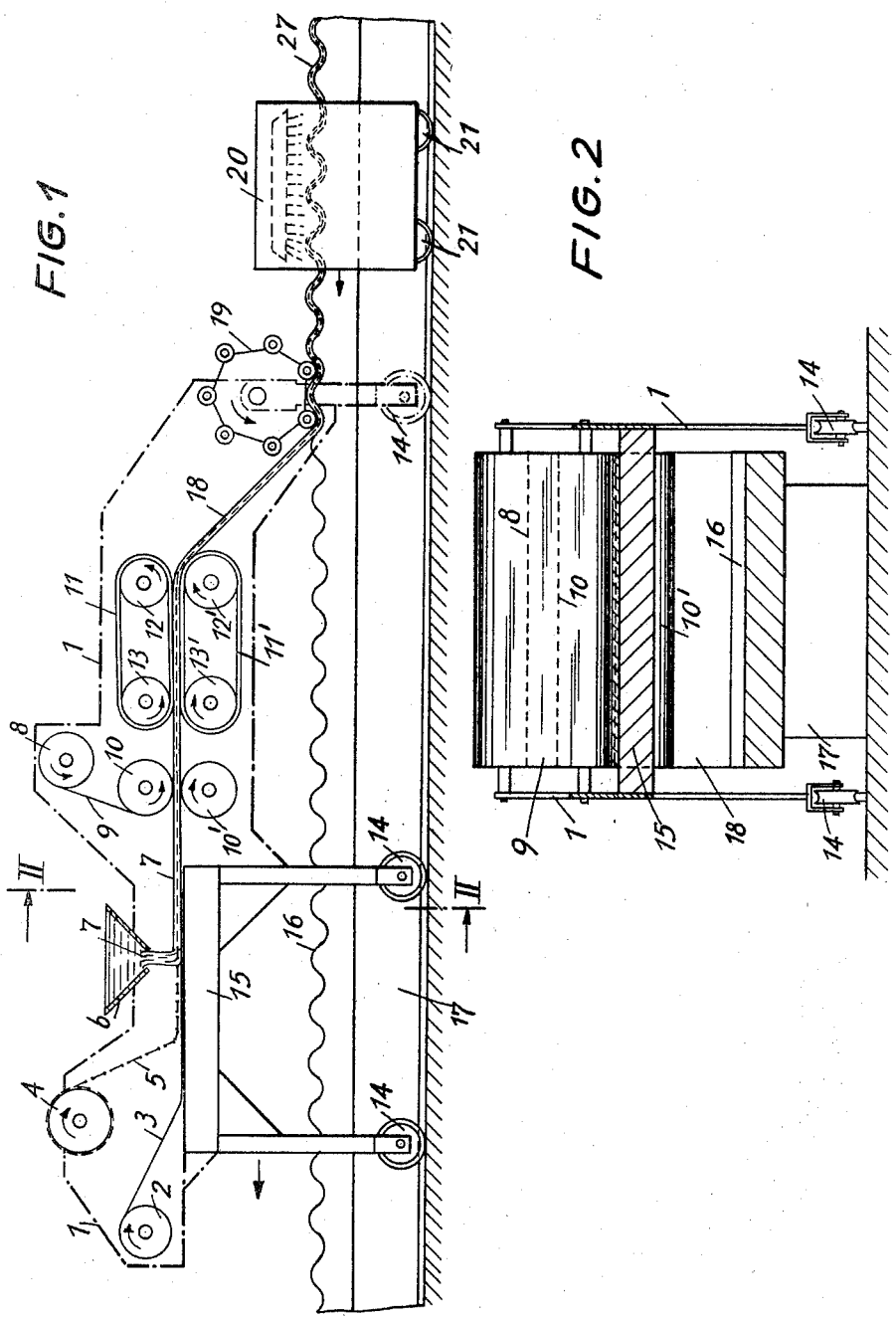

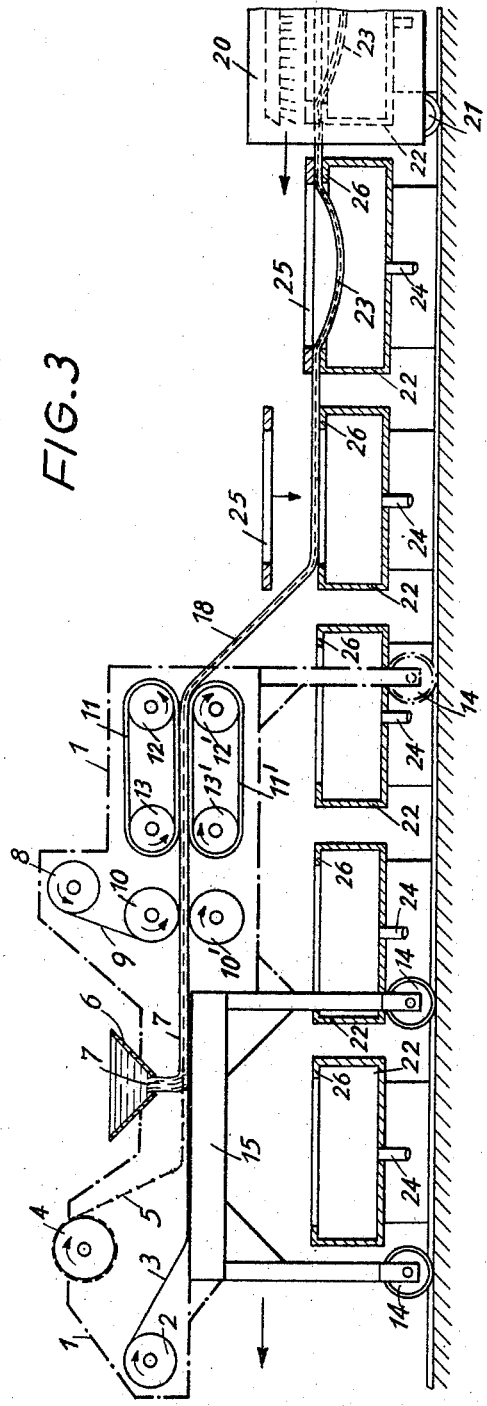

ABSTRACT OF THE DISCLOSURE

Apparatus for producing shaped parts from a laminate web including a film covered web of fiber-reinforced, hardened synthetic resin includes web preparation means and web conveying means mounted on a table or support which is movable relative to a mold surface. The conveying means comprises endless conveyors which deliver the prepared laminate web and lay this web onto the mold surface as the mold surface and the table are moved longitudinally relative to each other. The conveyors deliver the laminate web at a speed greater than the relative speed between the movable support or table and the mold surface, so that the laminate is deposited free from tensile stress.

In the event the mold surface is transversely corrugated, means are provided on the movable table or support for pressing the laminate into the undulations of the mold surface. A heating or curing device is provided and is movable relative to the mold surface so as to move along the laminate web laid onto the mold surface.

CROSS REFERENCE TO RELATED APPLICATION

This application is a division of our copending application Ser. No. 158,945, filed Dec. 8, 1961, for "Method and Apparatus for Producing Molded Plastic Goods With Reinforcing Inserts," now abandoned.

BACKGROUND OF THE INVENTION

The present invention relates to an apparatus for manufacturing molded products of plastics the walls of which are provided with reinforcing inserts, for example, in the form of a mat, fleece, or fabric of fibrous materials. Such plastic poducts are extensively applied for many different purposes especially because of their excellent mechanical properties which are attained by the reinforcing inserts which may consist, for example, of a glass fiber material.

The prior methods for manufacturing molded plastic products of the above-mentioned kind generally proceed from a laminated body which is composed of a reinforcing material which is impregnated with a liquid resin precondensate, and a pair of cover sheets which cover the liquid resin at the upper and lower sides. By suitable means such as rollers or belts which exert a certain pressure upon the different layers, the resin is then unifomly distributed within the laminated body, an excess of resin is expelled therefrom at the edges, and air which is enclosed in the laminated body is likewise expelled. The laminated body is thereafter passed to a molding tool and inserted therein in a manner so as to take up the shape of the walls of the mold. The properly molded laminated body is then solidified by curing of the resin which is generally carried out by catalytic agents under an increased temperature.

The different prior methods may be divided into two classes, those in which the molding process is carried out intermittently and those in which it is carried out more or less continuously. The intermittent method is still being applied primarily if relatively complicated parts are to be made, while the production of plastic goods of simple shapes, for example, of corrugated sheets, is generally carried out in a more or less continuous operation. When molding plastic goods by an intermittent operation, the laminated bodies must have a length and width corresponding to those of the desired product. For this purpose, the sheets and the reinforcing material which are used for forming the laminated body may either be cut to the required dimensions or be supplied in such dimensions before being applied upon each other or the laminating operation may be carried out continuously, for example, by applying the reinforcing material, which may be continuously unwound from a supply roll, upon a cover sheet which is likewise drawn from a supply roll, and by thereafter impregnating the reinforcing material with a synthetic resin. In order to cover the resin also on the upper side, a further cover sheet is continuously applied, and the laminated sheet which is thus formed is passed through the above-mentioned pressure-applying means in order to distribute the resin evenly and to expel the air which is enclosed in this body. The sections which are required for the molding process are then cut off from the laminated sheet. In order to prevent the liquid resin from dripping out at the place where the sheet is to be cut, the resin is preferably solidified within this area, preferably by curing.

The intermittent methods—regardless of whether the laminating process is carried out intermittently or continuously—have, however, the disadvantage that it is relatively complicated to convey the laminated sections to the mold or molds which form separate elements spaced from the laminating apparatus. This is especially due to the fact that, when moving the laminated sheet, it is difficult to maintain the required uniform distribution of the resin. For this reason, it is only possible to employ this method if the parts to be molded have relatively small dimensions. Apart from this, it is self-evident that the methods in which the molding process is carried out intermittently can never be economical if the particular article is to be mass-produced.

There are, however, some methods already known for manufacturing reinforced plastic products, in which not only the laminating process but also the molding process are carried out fully continuously. In these methods, the completely assembled but as yet uncured laminated material is supplied to revolving molding tools, for example, rollers or belts, the peripheral surfaces of which are of a sectional shape. These molding tools generally interengage with each other whereby the laminated material which is inserted between them is molded to the shape of these surfaces. The plane within which the laminated material is being conveyed is disposed at least shortly in front of the molding tools at substantially the same level as the plane in which the molding operation is carried out. The laminated material is therefore practically drawn through the molding tools as the result of their revolution. For curing the resin, the sectional rollers or belts may be heated, although this may also be done in a curing furnace separate from and subsequent to the molding tools.

Although the fully continuous molding process as previously known often permits a very economical manufacture of reinforced molded plastic goods, its application is limited to the manufacture of products of relatively simple shapes, for example, corrugated sheets, and it is unsuited for the production of goods of complicated shapes, especially of those with larger dimensions. A further disadvantage of the prior continuous molding process is that the apparatus required for its performance only permit the manufacture of plastic goods of one particular shape, unless the entire apparatus is rebuilt for the manufacture of goods of another shape which is a very expensive and time-wasting procedure.

It is an object of the present invention to provide an apparatus for manufacturing plastic goods the walls of which are provided with reinforcing inserts, which may be carried out by means of an apparatus which may be easily and inexpensively converted to produce plastic goods of different shapes, especially also molded products of large dimensions, for example, transparent domes for buildings.

Another object of the invention is to provide apparatus of the above-mentioned kind which also permits the simultaneous production of molded plastic goods of different shapes.

A further object of the invention is to provide such an apparatus which will operate economically even though only a relatively small series of one particular product is to be manufactured.

The above-mentioned objects may be attained according to the invention by applying the laminated sheet which is produced in the above-mentioned manner and preferably in a continuous operation, upon one or more molds which are mounted underneath the feeding plane of the sheet, and by moving the laminating unit and the mold or molds relative to each other. The apparatus according to the invention therefore permits either the laminating unit to be moved relative to the stationary mold or molds or, vice versa, the mold or molds to be moved relative to the laminating unit which is then mounted in a fixed position. Whichever embodiment of the apparatus is to be applied for carrying out the invention depends upon the particular circumstances in each case, for example, upon whether the molded goods to be produced are of a very complicated shape or whether they have large surfaces. In the latter case, it may be more convenient and also more economical if the laminating unit is moved over and along the stationary mold or molds. Such a stationary arrangement of the mold or molds facilitates their connection to one or more vacuum lines in order to produce a vacuum in the individual mold or molds either for carrying out the molding process or at least for assisting in this process so as to insure that the laminated sheet will be drawn tightly against the sectional shape of the walls of the mold or molds. Of course, if desirable in a particular case, it is also possible to move the laminating unit as well as the mold or molds in opposite directions to each other.

Since the invention permits the application of different molds even though it is carried out continuously, it is also possible to utilize the same apparatus for producing several plastic goods of different shapes simultaneously. This is not possible when employing one of the known continuous methods. The differently shaped molds are then arranged behind each other in the direction of movement of the respective part of the apparatus. The different molds may then, for example, be movable along a track underneath and along the laminating unit which may then be mounted, for example, in a fixed position. After the different sections of the laminated sheet have been applied upon the surfaces of the molds and are molded to the shape or shapes thereof and are threafter finally cured, they are taken out of the molds so that these empty molds may then be moved back to the other end of the entire apparatus where they are again placed underneath the laminating unit and moved relative thereto to receive the new sections of the laminated sheet which is fed continuously. During the curing process, the individual molded sections may either still adhere to each other or they may already be cut apart from each other. If they are cured in the form of a continuous sectional sheet, they are severed from each other after being cured, for example, by a cutting or sawing operation.

If the molded products are to be of a sample shape and consist, for example, of transversely corrugated sheets or webs, the mold upon which the laminated sheet is applied may consist of a sheet-metal plate or track which is provided with transverse corrugations and may, for example, be supported by a mobile frame.

The invention has the further great advantage that the amount of apparatus required as well as its cost are relatively small. It is therefore evident that the invention may be carried out very economically when producing smaller numbers of certain plastic articles or when mass-producing the same. As already indicated, the invention may also be employed for producing plastic goods with large surfaces, for example, of 50 meters or more.

These objects, features, and advantages of the present invention will become more clearly apparent from the following detailed description thereof which is to be read with reference to the accompanying drawings, in which:

FIGURE 1 shows a diagrammatic general view, partly in a longitudinal section, of an apparatus for producing transversely corrugated sheets according to the method;

FIGURE 2 shows a cross section taken along line II—II of FIGURE 1; while

FIGURE 3 shows a diagrammatic general view, partly in a longitudinal section, of an apparatus for producing molded cupola-shaped parts in accordance with the inventive method.

In the drawings, the various components of the apparatus according to the invention are mounted on a frame 1, as shown in FIGURE 2 and indicated in dot-and-dash lines in FIGURES 1 and 3. The apparatus comprises a supply roll 2 from which a cover sheet 3 is wound. Upon the upper side of this cover sheet 3 the reinforcing material is then applied which is wound from a supply roll 4 and is thereafter impregnated with a synthetic resin which is supplied from a funnel-like container 6. The resin-impregnated reinforcing material 5 is thereafter covered on the upper side by a cover sheet 9 which is wound from a supply roll 8 and is passed around a part of the periphery of the upper roller 10 of a pair of rollers 10 and 10' which respectively engage with the upper cover sheet 9 and the lower cover sheet 3 of the completely assembled laminated sheet 18 and then squeeze off any excess of resin from the laminated sheet and also remove the air which might be enclosed therein. Sheet 18 is then fed toward the right by the elastic conveyer belts 11 and 11' which are driven and guided by rollers 12, 12' or 13, 13'.

The entire frame 1 is mounted and movable on wheels 14 on a track. A part of frame 1 forms a work table 15 which serves as a support for parts of the laminated sheet while it is being assembled.

In the first embodiment of the invention as shown in FIGURE 1, the molding apparatus comprises a long sheetmetal plate forming a molding track 16 which is similar to a rolling face of a rolling mill and is provided with transverse corrugations and supported on a base 17. The laminated sheet or web 18 is continuously fed by the conveyer belts 11 and 11' from a plane above the corrugated molding plate 16 downwardly and upon the molding track 16. By means of a molding roller 19 which is likewise mounted on frame 1 and may be driven by suitable driving means, not shown, so as to turn in a counter-clockwise direction, the laminated sheet 18 is molded to the shape of the corrugations of the molding track 16.

Obviously, the speed of the relative movement between frame 1 and molding track 16 must be adjusted to be in accordance with the feeding speed of the laminated sheet 18. The process of curing the laminated sheet after it has been molded on the molding track 16 and provided with the transverse corrugations thereof is carried out in a curing furnace 20 which is preferably likewise movable on wheels 21. Thus, if the molding track 16 is mounted in a stationary position, furnace 20 can be moved along in a stationary position, furnace 20 can be moved along the uncured sections of the corrugated sheet 18 so that behind it, it leaves on the molding track 16 a long, finally cured corrugated sheet 27.

The apparatus as illustrated in FIGURE 3 differs from the apparatus according to FIGURE 1 merely in the shape and construction of the mold which in this embodiment consists of a plurality of box-shaped molds 22 which are designed for producing cupola-shaped parts 23. Each mold 22 is provided in its lower wall with a vacuum line 24 which is adapted to be connected to a suitable vacuum pump, not shown. During the relative movement between the entire apparatus on frame 1 and molds 22, one section after another of the laminated sheet 18 is deposited on the open upper sides of the successive molds 22 and each section is then drawn by the vacuum for a certain distance into the mold and thus provided with the desired cupola shape 23 which is thereafter permanently set by the curing treatment in the mobile curing furnace 20. After passing through the curing furnace 20, the adjacent cured cupola-shaped sections may be cut apart. For carrying out the molding operation of each section, a framelike member 25 is applied from above upon the sheet section so as to clamp the same tightly upon the flange 26 of mold 22. While in the particular embodiment of the invention as shown in FIGURE 3, the relative movement between the apparatus on frame 1 and molds 22 is produced by moving frame 1 and curing furnace 20 in a direction toward the left, as shown by the arrows, whereas molds 22 are mounted in a stationary position because of their connections to a vacuum line, it is obviously also possible to mount frame 1 and furnace 20 in a fixed position and to move molds 22 toward the right, that is, toward and through the furnace 20 which may then also be mounted in a fixed position.

Having thus fully disclosed our invention, what we claim is:

1. Apparatus for producing molded plastic goods from a laminate comprising a sheet of fiber-reinforced settable resin covered on bath surfaces by cover sheets, said apparatus comprising, in combination, means providing a stationary molding surface; a web preparing and conveying unit mounted on wheels movable on a track for movement longitudinally relative to said molding surface; and laminate preparing and laminate conveying means supported on said unit; said laminate preparing means including compressing means compressing the laminate to remove air bubbles from the laminate; said laminate conveying means comprising an endless belt conveyor receiving the laminate from said preparing means and laying the laminate downwardly onto said molding surface during movement of said unit along said molding surface means, said endless belt conveyor means feeding the laminate toward said molding surface at a speed sufficiently greater than the speed of movement of said unit along said molding surface means that the laminate is deposited free from tensile stress.

2. Apparatus for producing molded plastic goods, as claimed in claim 1, in which said molding surface is a platform corrugated transversely of the direction of movement of said unit.

3. Apparatus for producing molded plastic goods, as claimed in claim 2, including means mounted on said unit and engageable with the laminate layed on said molding surface to smooth the laminate into the troughs of the corrugations thereof.

4. Apparatus for producing molded plastic goods, as claimed in claim 1, in which said molding surface is subdivided into a plurality of aligned discrete molding surface sections.

5. Apparatus for producing molded plastic goods, as claimed in claim 1, incluring heating means mounted for movement relative to said molding surface means for setting the resin of the deposited molded laminate.

References Cited

UNITED STATES PATENTS

| | | | |
|---|---|---|---|
| 544,248 | 8/1895 | Cutler | 65—287 |
| 1,794,435 | 3/1931 | Barth | 264—296 |
| 2,702,435 | 2/1955 | Pinney | 34—105 |
| 2,784,763 | 3/1957 | Shorts | 156—201 |
| 2,968,335 | 1/1961 | Monaco et al. | 156—206 |
| 3,044,921 | 7/1962 | Wentworth et al. | 156—205 |
| 3,071,180 | 1/1963 | Finger et al. | 156—585 XR |
| 3,159,695 | 12/1964 | Behringer | 264—92 XR |

FOREIGN PATENTS 150,432    9/1920    Great Britain.

HAROLD ANSHER, Primary Examiner

H. F. EPSTEIN, Assistant Examiner

U.S. Cl. X.R.

264—90, 286; 18—19; 162—117